(12) United States Patent
Kim

(10) Patent No.: US 7,550,891 B2
(45) Date of Patent: Jun. 23, 2009

(54) PERMANENT MAGNET MOTOR HAVING STATOR POLES WITH STEPPED-END-SURFACES AND ROTOR WITH OUTER-CIRCUMFERENTIAL-RECESSED SURFACE

(75) Inventor: Young Kyoun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 11/325,508

(22) Filed: Jan. 5, 2006

(65) Prior Publication Data

US 2006/0279158 A1    Dec. 14, 2006

(30) Foreign Application Priority Data

Jun. 13, 2005   (KR) .................. 10-2005-0050534

(51) Int. Cl.
*H02K 1/14*   (2006.01)
*H02K 21/14*   (2006.01)

(52) U.S. Cl. ............. 310/216; 310/156.53; 310/156.56

(58) Field of Classification Search ............... 310/216, 310/254, 156.44–156.58, 261
See application file for complete search history.

(56) References Cited

U.S. PATENT DOCUMENTS

| 3,979,821 | A | | 9/1976 | Noodleman | |
|---|---|---|---|---|---|
| 4,998,032 | A | * | 3/1991 | Burgbacher | .................. 310/51 |
| 5,260,620 | A | * | 11/1993 | Morrill | ....................... 310/185 |
| 5,864,192 | A | * | 1/1999 | Nagate et al. | .......... 310/156.05 |
| 6,262,508 | B1 | * | 7/2001 | Shibayama et al. | ......... 310/181 |
| 6,342,745 | B1 | * | 1/2002 | Sakai et al. | ............. 310/156.56 |
| 6,486,581 | B2 | * | 11/2002 | Miyashita et al. | ....... 310/156.53 |
| 6,525,442 | B2 | * | 2/2003 | Koharagi et al. | ....... 310/156.48 |
| 6,774,521 | B2 | * | 8/2004 | Inayama et al. | ......... 310/156.53 |
| 6,798,103 | B2 | * | 9/2004 | Tajima et al. | .......... 310/156.53 |
| 6,847,144 | B1 | | 1/2005 | Luo | |
| 6,847,149 | B2 | * | 1/2005 | De Filippis | .................. 310/216 |
| 6,858,960 | B1 | | 2/2005 | Muszynski | |
| 7,042,127 | B2 | * | 5/2006 | Tsuruta et al. | ......... 310/156.53 |
| 7,151,335 | B2 | * | 12/2006 | Tajima et al. | .......... 310/156.48 |
| 2003/0107290 | A1 | | 6/2003 | De Filippis | |
| 2004/0130231 | A1 | | 7/2004 | Fratta | |

FOREIGN PATENT DOCUMENTS

| JP | 2002-209350 | 7/2002 |
|---|---|---|
| JP | 2005245146 | 9/2005 |
| WO | 01/84696 | 11/2001 |
| WO | 2005/074099 | 8/2005 |

OTHER PUBLICATIONS

European Search Report in corresponding Patent Application No. 06000393.6-2207 dated Jun. 16, 2006.
Chinese Office Action, Sep. 19, 2008 (9 pgs).

* cited by examiner

*Primary Examiner*—Tran N Nguyen
(74) *Attorney, Agent, or Firm*—Staas & Halsey LLP

(57) ABSTRACT

A permanent-magnet motor including a rotor having permanent magnets disposed therein, and a stator, wherein an outer circumferential surface of the rotor is opposite to an inner circumferential surface of the stator, and one or both of the outer circumferential surface of the rotor and the inner circumferential surface of the stator are varied in a radial direction so as to provide a non-uniform gap between the two surfaces to approximate sinusoidal change in magnetic flux.

15 Claims, 15 Drawing Sheets

PERMANENT MAGNET MOTOR HAVING STATOR POLES WITH STEPPED-END-SURFACES AND ROTOR WITH OUTER-CIRCUMFERENTIAL-RECESSED SURFACE

CROSS-REFERENCE TO RELATED APPLICATIONS

This application claims the benefit of Korean Patent Application No. 2005-50534, filed on Jun. 13, 2005, in the Korean Intellectual Property Office, the disclosure of which is incorporated herein by reference.

BACKGROUND OF THE INVENTION

1. Field of the Invention

The present invention relates to a permanent-magnet motor used in compressors of domestic refrigerators and air conditioners or other various kinds of industrial machinery, and, more particularly, to a permanent-magnet motor that is capable of approximating a back electro motive force wave to a sinusoidal wave, thereby lowering noise and increasing efficiency.

2. Description of the Related Art

Generally, a permanent-magnet motor, such as a brushless DC motor, has permanent magnets mounted at a rotor core to generate a rotary driving force. Based on how the permanent magnets are mounted at the rotor core, permanent-magnet motors are classified into surface-mounted permanent-magnet motors and embedded permanent-magnet motors.

The embedded permanent-magnet motor has a plurality of permanent magnets mounted in the rotor core. In the embedded permanent-magnet motor, dispersion of the permanent magnets is structurally prevented using magnet torque as well as reluctance torque. Consequently, the embedded permanent-magnet motor provides a higher efficiency than the surface-mounted permanent-magnet motor, which has permanent magnets mounted on the surface of the rotor core to create a magnetic field, and therefore, the embedded permanent-magnet motor is used when high-speed rotation is required.

Based on how coils are wound on a stator core, embedded permanent-magnet motors are classified into coil concentration-type motors and coil distribution-type motors. FIG. 1 is a cross-sectional view illustrating a conventional permanent-magnet motor constructed in accordance with a coil distribution-type winding method, and FIG. 2 is a cross-sectional view illustrating another conventional permanent-magnet motor constructed in accordance with a coil concentration-type winding method.

Referring to FIGS. 1 and 2, the conventional permanent-magnet motor comprises: a stator 1a,1b on which coils are wound; and a rotor 4a,4b rotatably disposed in the stator 1a,1b.

The stator 1a,1b comprises: a stator core 2a,2b formed by stacking a plurality of magnetic steel sheets in the shape of a cylinder; a plurality of slots 3a,3b formed at the stator core 2a,2b while being arranged in a circumferential direction; and a plurality of coils wound on the slots 3a,3b.

The rotor 4a,4b comprises: a rotor core 5a,5b formed by stacking a plurality of magnetic steel sheets in the shape of a cylinder, the rotor core 5a,5b being disposed in a hollow part of the stator 1a,1b while being spaced a predetermined distance from the hollow part of the stator 1a,1b; a plurality of permanent magnet insertion holes 6a,6b formed at the rotor core 5a,5b while being arranged in the circumferential direction; and a plurality of permanent magnets 7a,7b inserted in the permanent magnet insertion holes 6a,6b, respectively. A rotary shaft 8a,8b is inserted in a hollow part formed at the center of the rotor 4a,4b, and is thereby is rotated along with the rotor 4a,4b.

When electric current is supplied to coils wound on the slots 3a,3b of the stator 1a,1b of the conventional permanent-magnet motor with the construction described above, polarities of the coils are sequentially changed. Therefore, a rotary magnetic field is generated at teeth 9a,9b of the stator 1a,1b formed between the slots 3a,3b. Consequently, a magnetic field is created at the rotor 4a,4b, in which the permanent magnets 7a,7b are embedded while being adjacent to the teeth 9a,9b. The magnetic field of the rotor 4a,4b follows the rotary magnetic field generated at the teeth 9a,9b of the stator 1a,1b, and, therefore, the rotor 4a,4b is rotated along with the rotary shaft 8a,8b to generate a rotary driving force.

In the embedded permanent-magnet motor, a back electro motive force wave, induced at the coils wound on the stator slots 3a,3b, contains many high harmonic components depending upon the location and shape of the permanent magnets 7a,7b embedded in the rotor 4a,4b. However, the length of a gap 94a,94b between the surface of each of the teeth 9a,9b and the outer circumferential surface of the rotor 4a,4b is uniform. As a result, a change in magnetic flux at the gap 94a,94b according to the rotation of the rotor 4a,4b is made in the shape of a non-sinusoidal wave. Therefore, the back electro motive force wave is distorted, as shown in FIG. 3. Consequently, a non-sinusoidal back electro motive force wave is created, and, therefore, torque ripple is increased. As a result, vibration is generated when the rotor 4a,4b is rotated, and noise is increased due to the vibration. Consequently, efficiency of the motor is lowered.

SUMMARY OF THE INVENTION

Therefore, it is an aspect of the invention to provide a permanent-magnet motor having stepped protrusions formed at the middle parts of teeth of a stator and/or stepped grooves formed at the outer circumferential surface of a rotor to approximate change in magnetic flux at a gap to a sinusoidal wave, thereby creating a sinusoidal back electro motive force wave.

Additional aspects and/or advantages of the invention will be set forth in part in the description which follows and, in part, will be apparent from the description, or may be learned by practice of the invention.

In accordance with one aspect, the present invention provides a permanent-magnet motor comprising a stator and a rotor having permanent magnets disposed therein, wherein the rotor has one or more grooves formed at the outer circumferential surface thereof, the grooves being opposite to the inner circumferential surface of the stator, to approximate sinusoidal change in magnetic flux.

The one or more grooves may comprise a plurality of grooves arranged on the outer circumferential surface of the rotor in a circumferential direction, the plurality of grooves being spaced a predetermined gap from the inner circumferential surface of the stator.

The rotor may be provided with flux barrier holes formed at opposite ends of the permanent magnets, and the grooves may be respectively provided adjacent to the flux barrier holes.

The flux barrier holes may be disposed in parallel with permanent magnet insertion holes, in which the permanent magnets are respectively inserted.

The one or more grooves may be formed in a shape of at least one step.

In accordance with another aspect, the present invention provides a permanent-magnet motor comprising a stator provided with a plurality of teeth, and a rotor having permanent magnets disposed therein, wherein the stator has one or more protrusions respectively formed at surfaces of the teeth, the protrusions being opposite to the outer circumferential surface of the rotor, to approximate sinusoidal change in magnetic flux.

The one or more protrusions may be formed at middle parts of the teeth of the stator, the teeth being spaced a predetermined gap from the outer circumferential surface of the rotor.

Each of the one or more protrusions may be formed in the shape of at least one step.

In accordance with yet another aspect, the present invention provides a permanent-magnet motor comprising a stator provided with a plurality of teeth, and a rotor having permanent magnets disposed therein, wherein the rotor has one or more rotor grooves formed at the outer circumferential surface thereof, the grooves being opposite to the inner circumferential surface of the stator, to approximate sinusoidal change in magnetic flux, and the stator has one or more stator protrusions respectively formed at the surfaces of the teeth, the protrusions being opposite to the outer circumferential surface of the rotor, to approximate the sinusoidal change in magnetic flux.

The one or more stator protrusions may be formed at the middle parts of the teeth of the stator in the shape of at least one step.

The one or more rotor grooves may comprise a plurality of rotor grooves arranged on the outer circumferential surface of the rotor in a circumferential direction, the grooves being spaced a predetermined gap from the inner circumferential surface of the stator.

The rotor may be provided with flux barrier holes formed at opposite ends of the permanent magnets, and the grooves may be respectively provided adjacent to the flux barrier holes.

The one or more rotor grooves may be formed in the shape of at least one step.

In accordance with yet another aspect, the present invention provides a permanent-magnet motor comprising a stator and a rotor having permanent magnets disposed therein, wherein the stator has one or more protrusions formed at an inner circumferential surface thereof, the protrusions being opposite to an outer circumferential surface of the rotor, to approximate sinusoidal change in magnetic flux.

In accordance with yet another aspect, the present invention provides a permanent-magnet motor comprising a stator and a rotor having permanent magnets disposed therein; wherein an outer circumferential surface of the rotor, opposite to an inner circumferential surface of the stator, varies in a radial direction so as to provide a non-uniform gap between the rotor and stator to approximate sinusoidal change in magnetic flux.

In accordance with yet another aspect, the present invention provides a permanent-magnet motor comprising a rotor having permanent magnets disposed therein, and a stator having teeth extending inward toward the rotor, wherein an inner circumferential surface of the teeth of the stator, opposite to an outer circumferential surface of the rotor, varies in a radial direction so as to provide a non-uniform gap between the rotor and stator to approximate sinusoidal change in magnetic flux.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
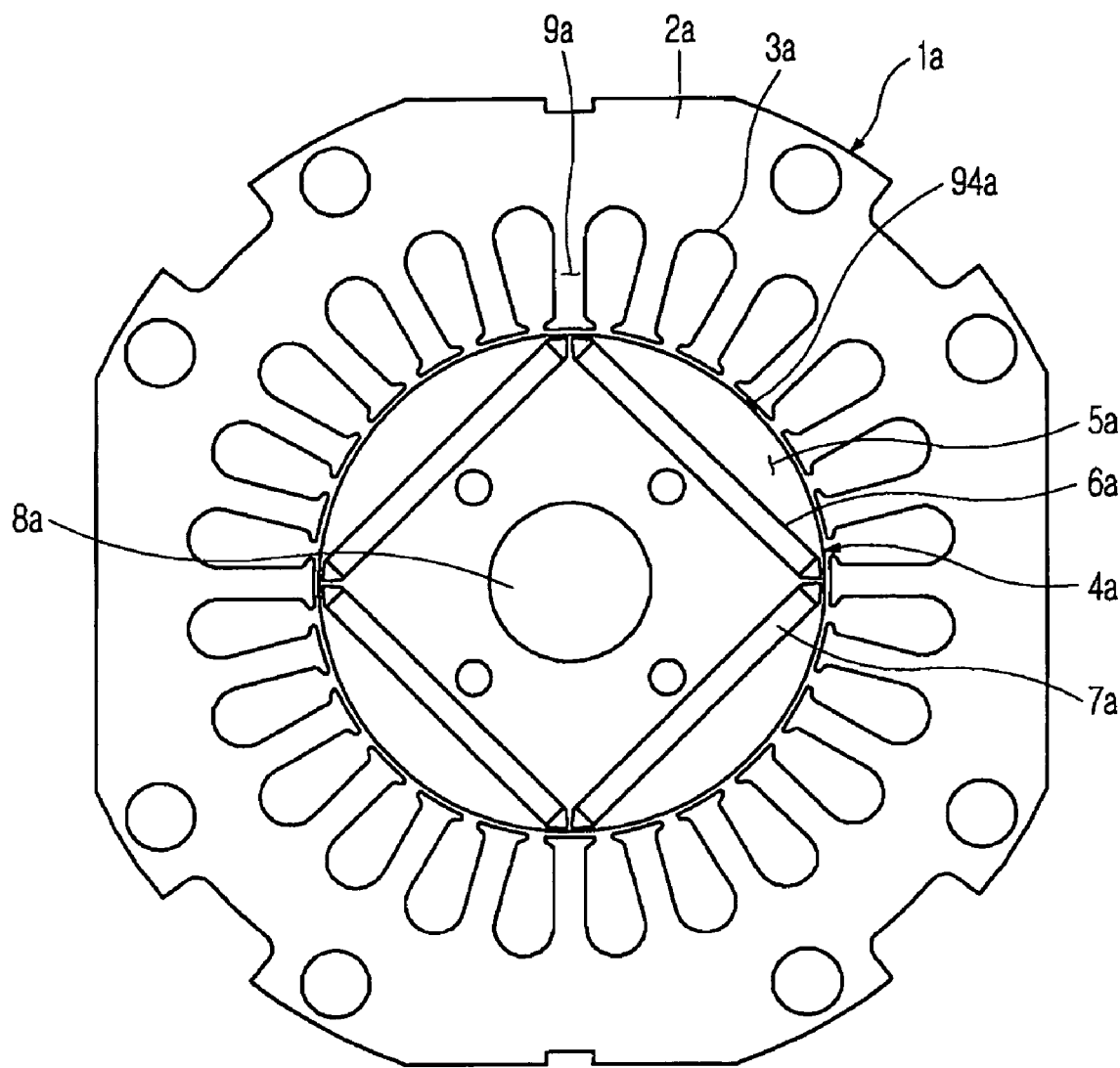
FIG. 1 is a cross-sectional view illustrating a conventional permanent-magnet motor constructed in accordance with a coil distribution-type winding method.
Figure 2:
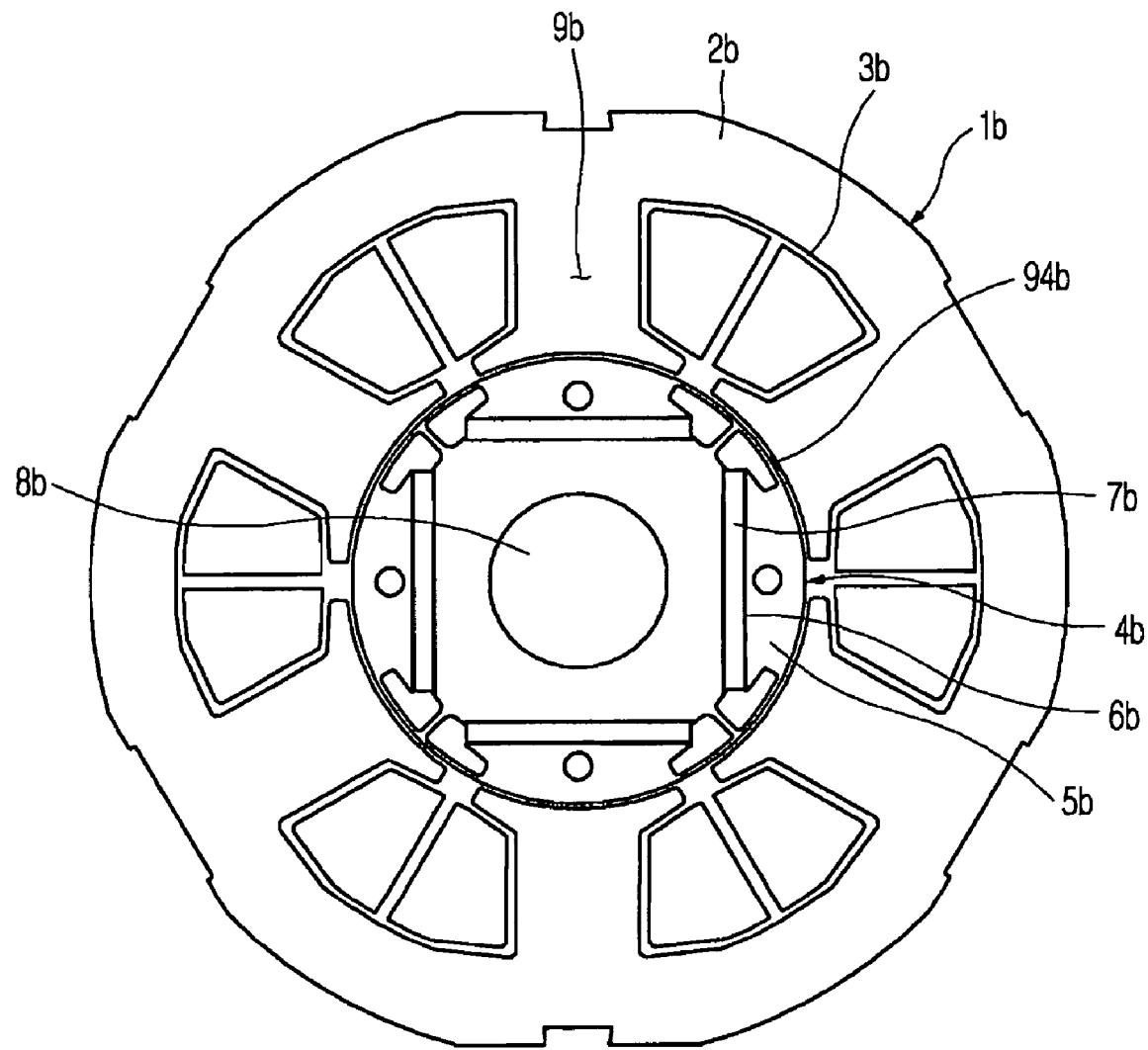
FIG. 2 is a cross-sectional view illustrating another conventional permanent-magnet motor constructed in accordance with a coil concentration-type winding method.
Figure 3:
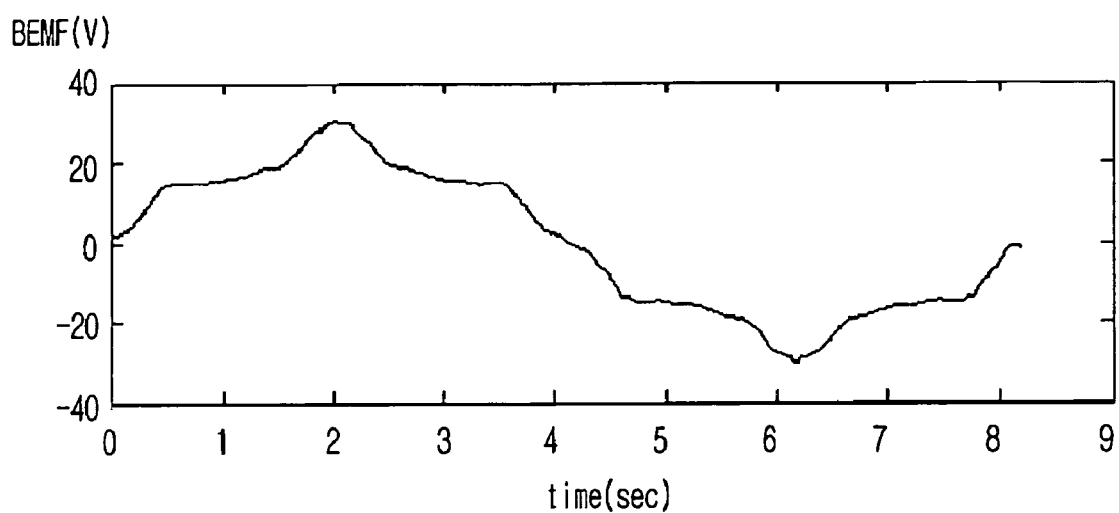
FIG. 3 is a graph illustrating a back electro motive force of the conventional permanent-magnet motor.
Figure 3:
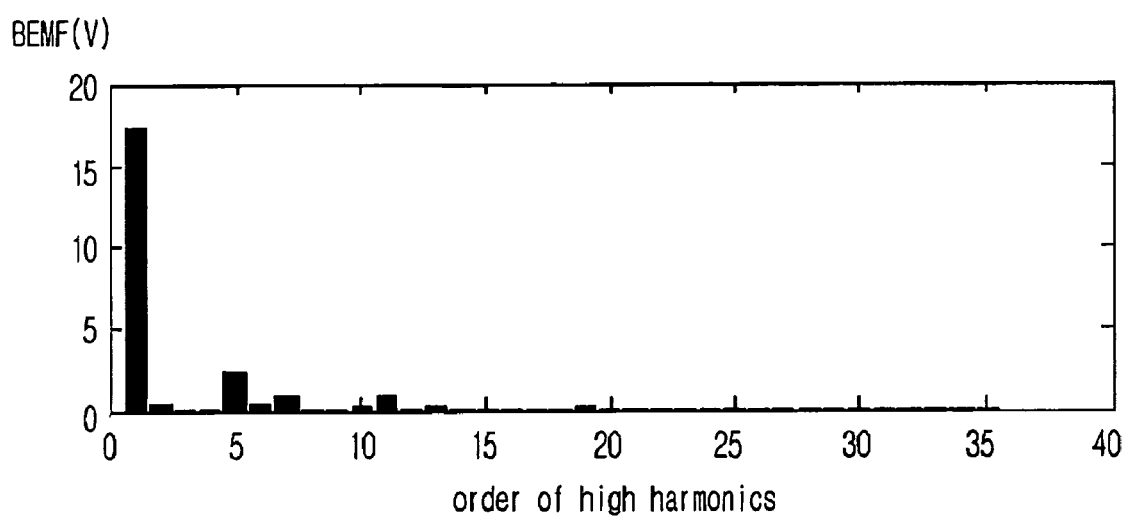

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
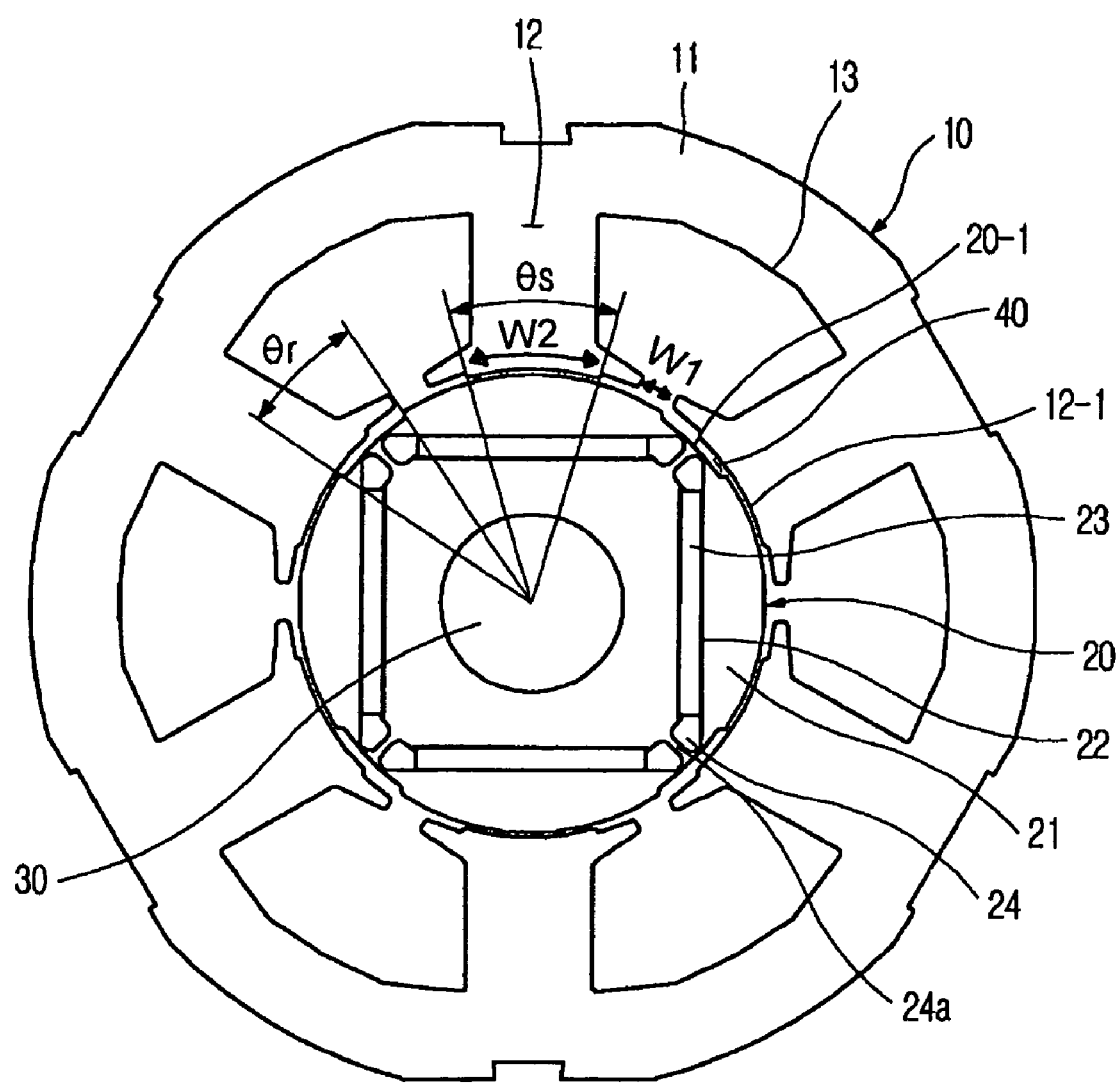
FIG. 4 is a cross-sectional view illustrating a permanent-magnet motor according to an embodiment of the present invention.
Figure 5:
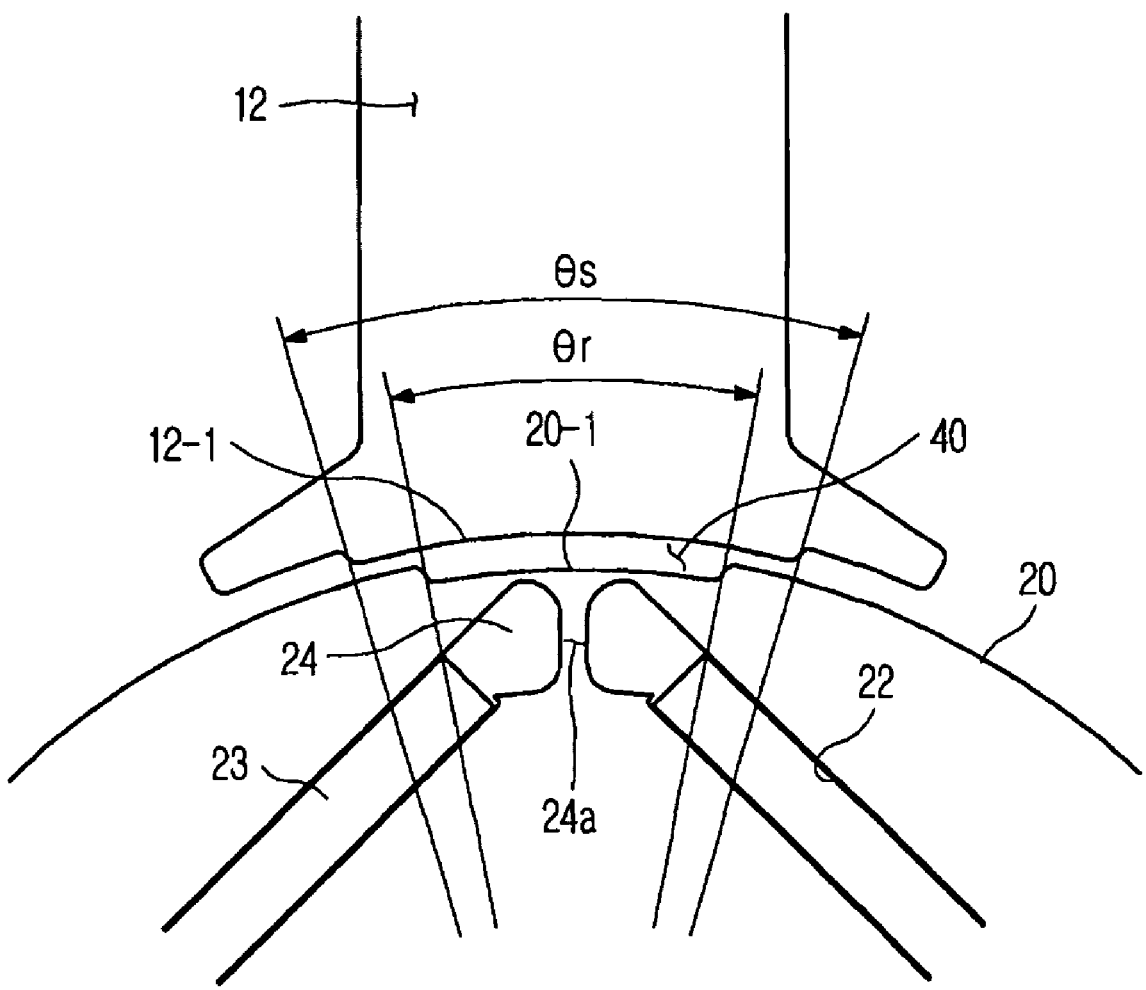
FIG. 5 is a detailed view illustrating the teeth of the stator and the surface of the rotor shown in FIG. 4.

FIG. 4 is a cross-sectional view illustrating a permanent-magnet motor according to an embodiment of the present invention, and FIG. 5 is a detailed view illustrating the teeth of the stator and the surface of the rotor shown in FIG. 4.

Referring to FIG. 4, the permanent-magnet motor comprises: a stator 10 formed by stacking a plurality of magnetic steel sheets in the shape of a cylinder; a rotor 20 formed by stacking a plurality of magnetic steel sheets in the shape of a cylinder, the rotor 20 being rotatably disposed in the stator 10 while being spaced a predetermined distance from the stator 10; and a rotary shaft 30 inserted in a hollow center of the rotor 20 such that the rotary shaft 30 is rotated along with the rotor 20.

The stator 10 comprises: a circular stator core 11 forming the outer edge of the stator 10; a plurality of teeth 12 extending inward from the stator core 11 in the radial direction; a plurality of slots 13 formed between the respective teeth 12; and coils wound on the slots 13 to create a three-phase magnetic field.

As shown in FIG. 5, each of the teeth 12 of the stator 10 is provided at the middle part thereof with a stepped stator protrusion 12-1 such that the length of a gap 40 between the surface of each of the teeth 12 of the stator 10 and the outer circumferential surface of the rotor 20 is not uniform. The provision of the stepped stator protrusions 12-1 with outermost ends of adjacent teeth spaces apart W1 (see FIG. 4) serves to approximate the change in magnetic flux at the gap 40, due to rotation of the rotor 20, to a sinusoidal wave.

The stator protrusion 12-1 protrudes in a one-stepped shape in a width W2 measured by a stator protrusion angle $\theta_s$ about the rotary shaft 30, wherein W2>W1. Preferably, though not necessarily, the stator protrusion angle $\theta_s$ is approximately 32 degrees.

The rotor 20 comprises: a rotor core 21 approximately formed in the shape of a cylinder; a plurality of permanent magnet insertion holes 22 formed at the edge of the rotor core 21 while being arranged in the circumferential direction; and a plurality of permanent magnets 23 inserted in the permanent magnet insertion holes 22, respectively.

The permanent magnets 23 are inserted in the respective permanent magnet insertion holes 22 such that neighboring magnetic poles have opposite polarities. At opposite ends of each permanent magnet 23 are formed flux barrier holes 24 to prevent a short and/or leakage of magnetic flux. The flux barrier holes 24 are disposed in parallel with the permanent magnet insertion holes 22, or on the same line as the permanent magnet insertion holes 22.

On the outer circumferential surface of the rotor 20 are formed stepped rotor grooves 20-1, which are adjacent to the flux barrier holes 24 and arranged in the circumferential direction, as shown in FIG. 5, such that the length of the gap 40 between the surface of each of the teeth 12 of the stator 10 and the outer circumferential surface of the rotor 20 is not uniform. The provision of the stepped rotor grooves 20-1 serves to approximate the change in magnetic flux at the gap 40, due to rotation of the rotor 20, to a sinusoidal wave.

Each of the stepped rotor grooves 20-1 is depressed in a one-stepped shape in a width measured by a rotor groove angle $\theta_r$ about the rotary shaft 30. Preferably, though not necessarily, the rotor groove angle $\theta_r$ is approximately 22 degrees.

When electric current is supplied to the coils wound on the slots 13 of the stator 10 of the permanent-magnet motor with the construction described above, polarities of the coils are sequentially changed, and, therefore, a rotary magnetic field is generated at the teeth 12 formed between the slots 13. Consequently, a magnetic field is created at the rotor 20, in which the permanent magnets 23 are embedded while being adjacent to the teeth 12. The magnetic field of the rotor 20 follows the rotary magnetic field generated at the teeth 12 of the stator 10, and, therefore, the rotor 20 is rotated along with the rotary shaft 30 to generate a rotary driving force.

At this time, a back electro motive force wave induced at the coils of the stator 10 contains many high harmonic components due to magnetic flux concentration at opposite ends of the teeth 12 of the stator 10, and bridge parts 24a of the rotor 20. According to this embodiment of the present invention, the one-stepped stator protrusions 12-1 are formed at the middle parts of the teeth 12 of the stator 10, and the one-stepped rotor grooves 20-1 are formed on the outer circumferential surface of the rotor 20 so as to be adjacent to the bridge parts 24a of the rotor 20. As a result, the length of the gap 40 between the surface of each of the teeth 12 of the stator 10 and the outer circumferential surface of the rotor 20 is not uniform, and, therefore, the change in magnetic flux at the gap 40 due to rotation of the rotor 20 is approximated to a sinusoidal wave. Consequently, a sinusoidal back electro motive force wave is created.

Figure 6:
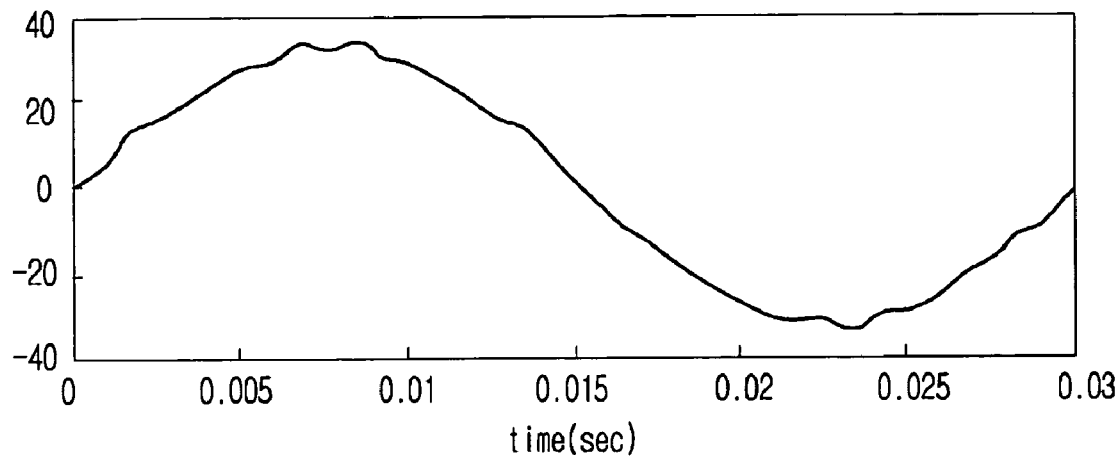
FIG. 6 is a graph illustrating a back electro motive force of the permanent-magnet motor according to the embodiment of the present invention shown in FIG. 4.
Figure 6:
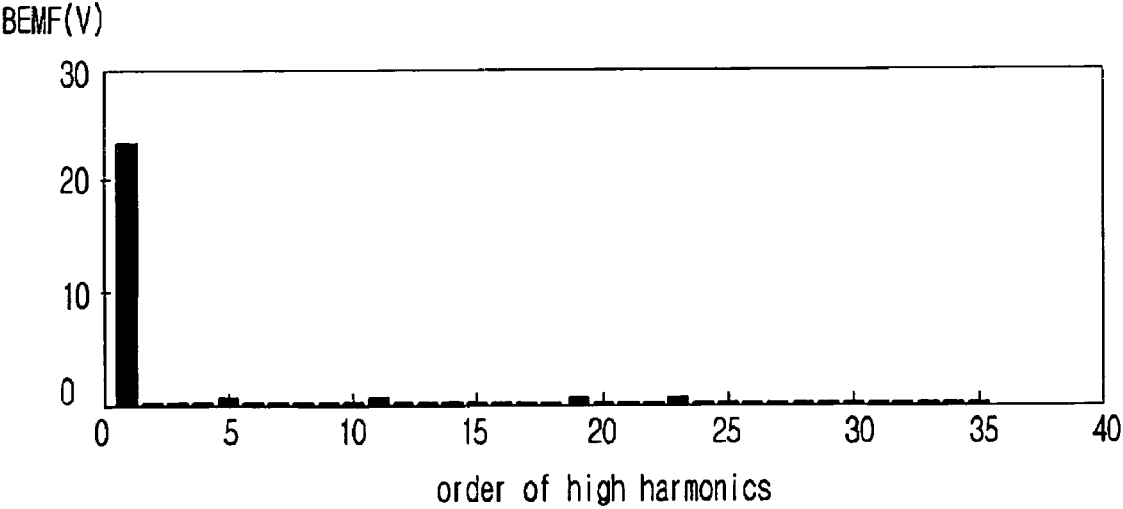

The back electro motive force (BEMF) of the permanent-magnet motor of this embodiment of the present invention is illustrated in FIG. 6.

As shown in FIG. 6, all of the high harmonic components except the first high harmonic are reduced by forming the one-stepped stator protrusions 12-1 at the middle parts of the teeth 12 of the stator 10, and the one-stepped rotor grooves 20-1 at the outer circumferential surface of the rotor 20. Consequently, the back electro motive force wave is approximated to a sinusoidal wave.

As a result, torque ripple is decreased, and, therefore, vibration generated during rotation of the rotor 20 is minimized, and noise is also decreased. Consequently, reliability of the motor is improved.

Figure 7:
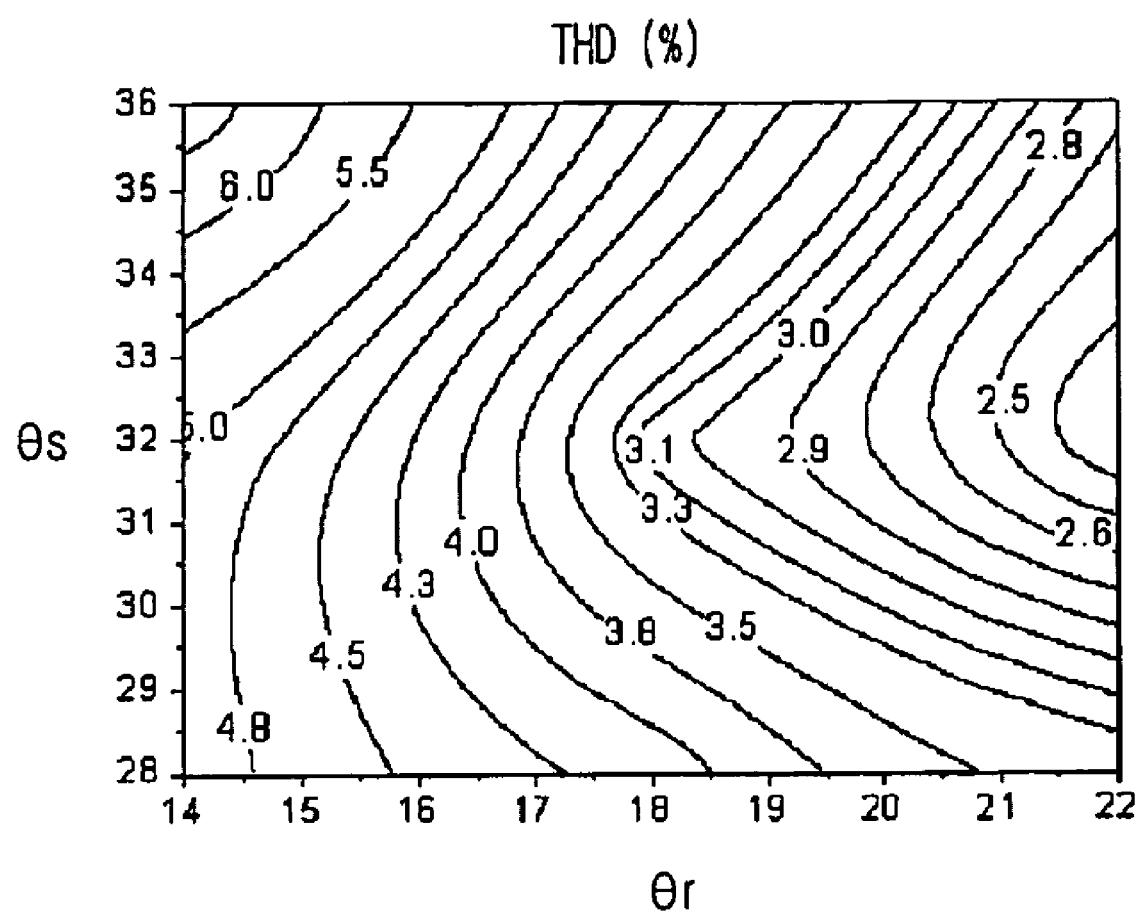
FIG. 7 is a view illustrating distribution of total harmonic distortion (THD) of the back electro motive force of the permanent-magnet motor according to the embodiment of the present invention showed in FIG. 4 based on change in a stator protrusion angle $\theta_s$ and a rotor groove angle $\theta_r$.

FIG. 7 illustrates the simulation results of total harmonic distortion (THD) of a back electro motive force generated when the stator protrusion angle $\theta_s$ is changed within a range of 28 to 36 degrees, and the rotor groove angle $\theta_r$ is changed within a range of 14 to 22 degrees.

As can be seen from FIG. 7, the total harmonic distortion (THD) of the back electro motive force of the permanent-magnet motor according to this embodiment of the present invention, which is characterized in that the one-stepped stator protrusions 12-1 are formed at the middle parts of the teeth 12 of the stator 10, and the one-stepped rotor grooves 20-1 are formed at the outer circumferential surface of the rotor 20, is approximately 2.9 to 3%, which is less than the total harmonic distortion (approximately 15%) of the back electro motive force of the conventional permanent-magnet motor.

Figure 8:
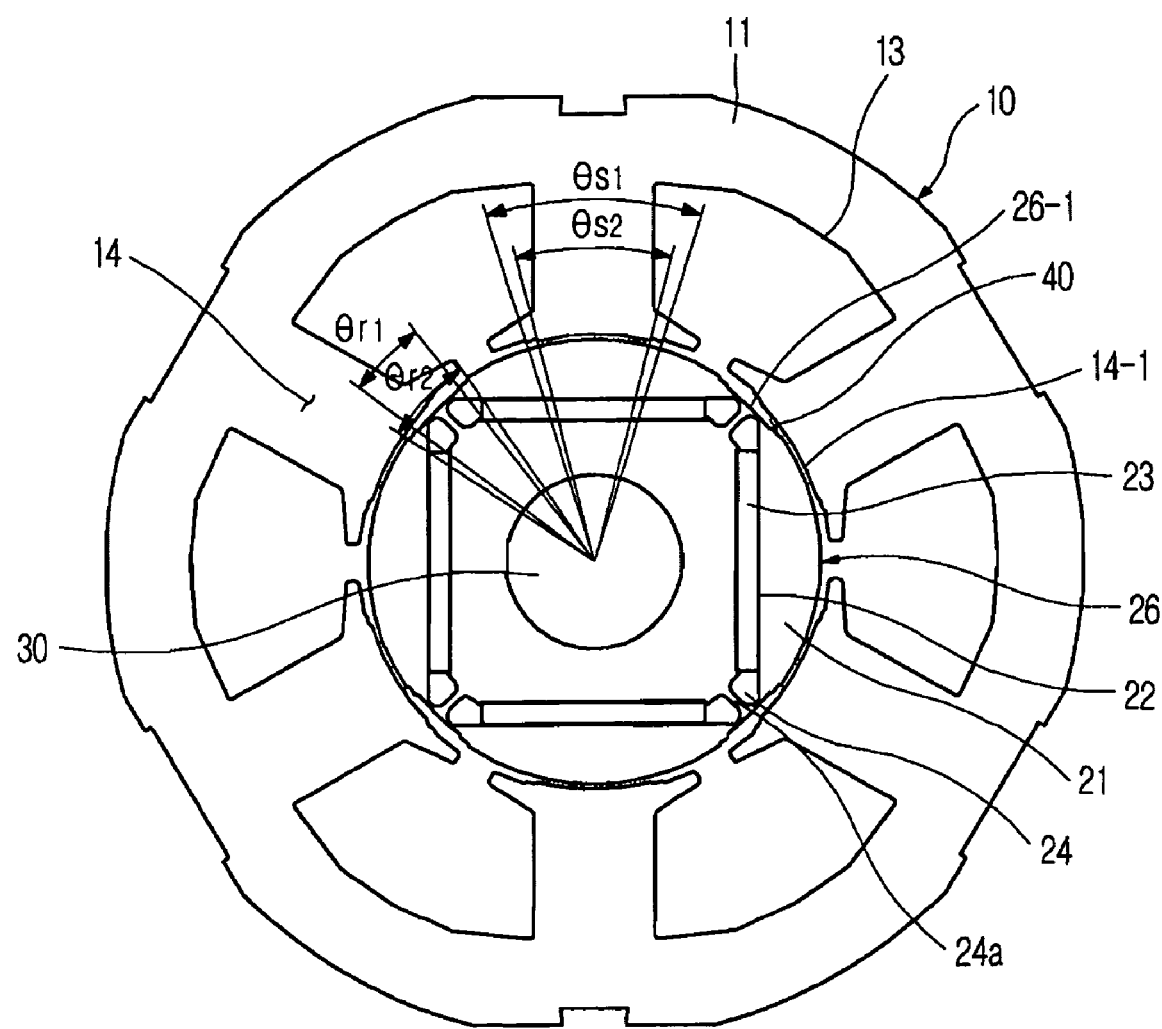
FIG. 8 is a cross-sectional view illustrating a permanent-magnet motor according to another embodiment of the present invention.
Figure 9:
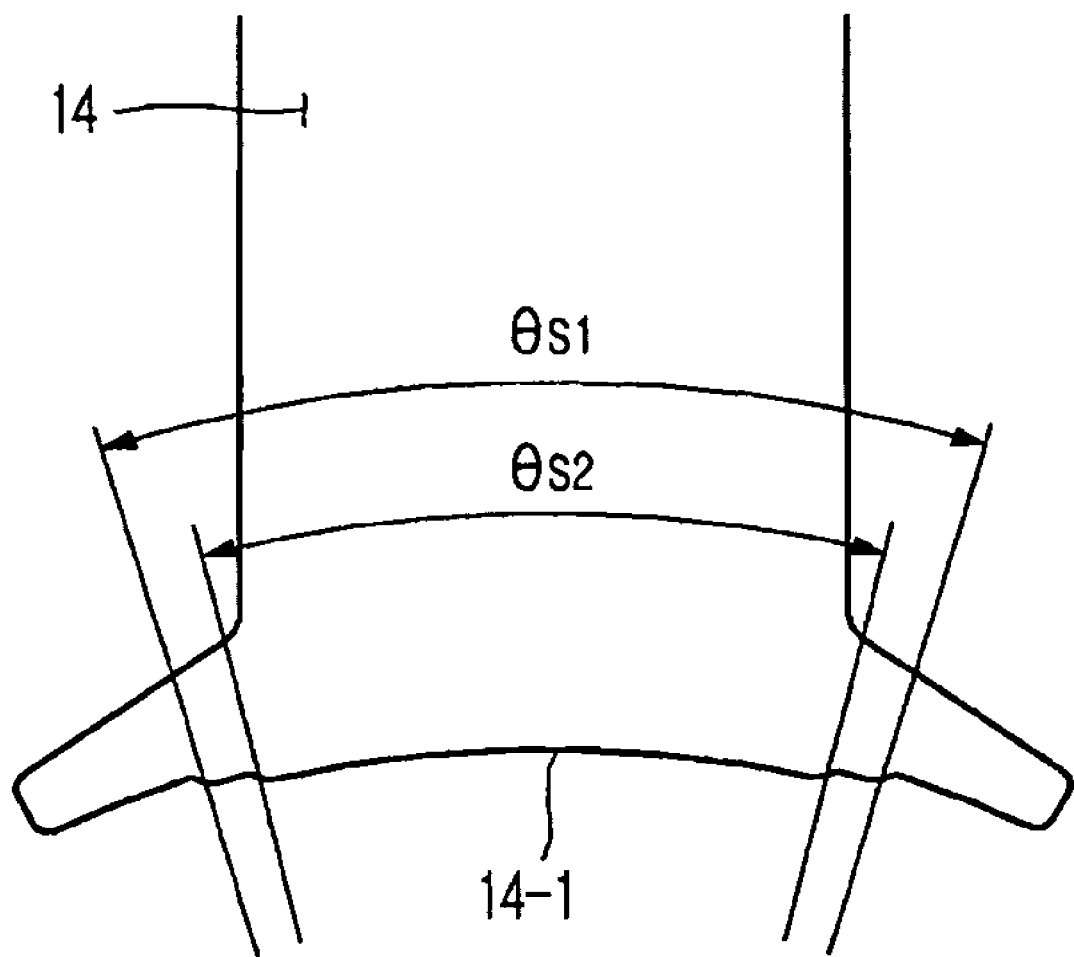
FIG. 9 is a detailed view illustrating the teeth of the stator shown in FIG. 8.
Figure 10:
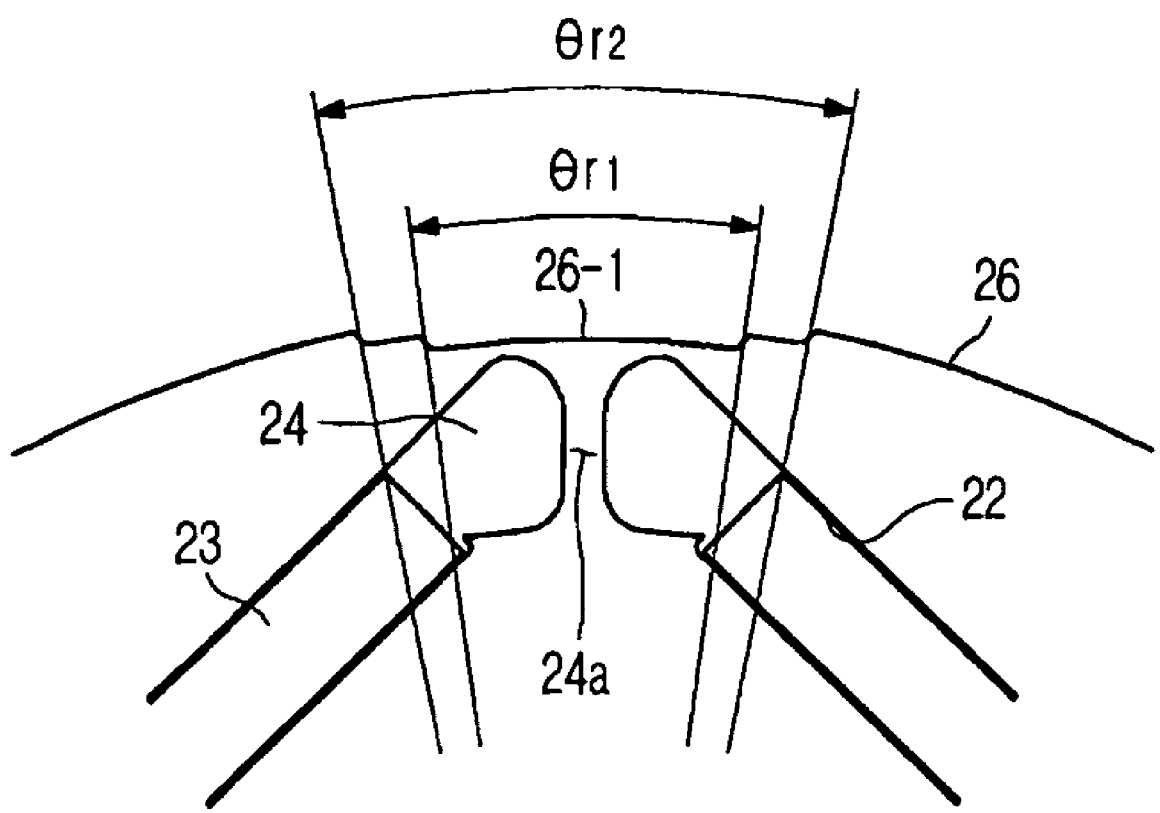
FIG. 10 is a detailed view illustrating the surface of the rotor shown in FIG. 8.

FIG. 8 is a cross-sectional view illustrating a permanent-magnet motor according to another embodiment of the present invention, FIG. 9 is a detailed view illustrating the teeth of the stator shown in FIG. 8, and FIG. 10 is a detailed view illustrating the surface of the rotor shown in FIG. 8. Components of this preferred embodiment of the present invention, which may be identical to those of the previously discussed embodiment of the present invention, may be indicated by the same reference numerals as those of the previously discussed embodiment of the present invention, and a detailed description thereof will not be given.

Referring to FIGS. 8 and 9, each of teeth 14 of the stator 10 is provided at the middle part thereof with a stepped stator protrusion 14-1 such that the length of the gap 40 between the surface of each of the teeth 14 of the stator 10 and the outer circumferential surface of a rotor 26 is not uniform.

The stator protrusion 14-1 protrudes in a width measured by a first stator protrusion angle $\theta_{s1}$ about the rotary shaft 30, and further protrudes in a width measured by a second stator protrusion angle $\theta_{s2}$ about the rotary shaft 30. Consequently, the stator protrusion 14-1 is formed in a two-stepped shape. Preferably, though not necessarily, the first stator protrusion angle $\theta_{s1}$ is approximately 34 degrees, and the second stator protrusion angle $\theta_{s2}$ is approximately 28 degrees.

Referring to FIGS. 8 and 10, the rotor 26 is provided at the outer circumferential surface thereof with stepped rotor grooves 26-1, which are adjacent to the flux barrier holes 24 and arranged in the circumferential direction, such that the length of the gap 40 between the surface of each of the teeth 14 of the stator 10 and the outer circumferential surface of the rotor 26 is not uniform.

Each of the stepped rotor grooves 26-1 is depressed in a width measured by a second rotor groove angle $\theta_{r2}$ about the rotary shaft 30, and is further depressed in a width measured by a first rotor groove angle $\theta_{r1}$ about the rotary shaft 30. Consequently, each of the stepped rotor grooves 26-1 is formed in a two-stepped shape. Preferably, though not necessarily, the second rotor groove angle $\theta_{r2}$ is approximately 22 degrees, and the first rotor groove angle $\theta_{r1}$ is approximately 16 degrees.

When electric current is supplied to the coils wound on the slots 13 of the stator 10 of the permanent-magnet motor with the construction described above, polarities of the coils are sequentially changed, and, therefore, a rotary magnetic field is generated at the teeth 14 formed between the slots 13. Consequently, a magnetic field is created at the rotor 26, in which the permanent magnets 23 are embedded while being adjacent to the teeth 14. The magnetic field of the rotor 26 follows the rotary magnetic field generated at the teeth 14 of the stator 10, and, therefore, the rotor 26 is rotated along with the rotary shaft 30 to generate a rotary driving force.

At this time, a back electro motive force wave induced at the coils of the stator 10 contains many high harmonic components due to magnetic flux concentration at opposite ends of the teeth 14 of the stator 10, and bridge parts 24a of the rotor 26. According to this embodiment of the present invention, the two-stepped stator protrusions 14-1 are formed at the middle parts of the teeth 12 of the stator 10, and the two-stepped rotor grooves 26-1 are formed on the outer circumferential surface of the rotor 26 so as to be adjacent to the bridge parts 24a of the rotor 26. As a result, the length of the gap 40 between the surface of each of the teeth 14 of the stator 10 and the outer circumferential surface of the rotor 26 is not uniform, and, therefore, the change in magnetic flux at the gap 40 due to rotation of the rotor 26 is approximated to a sinusoidal wave. Consequently, a sinusoidal back electro motive force wave is created.

Figure 11:
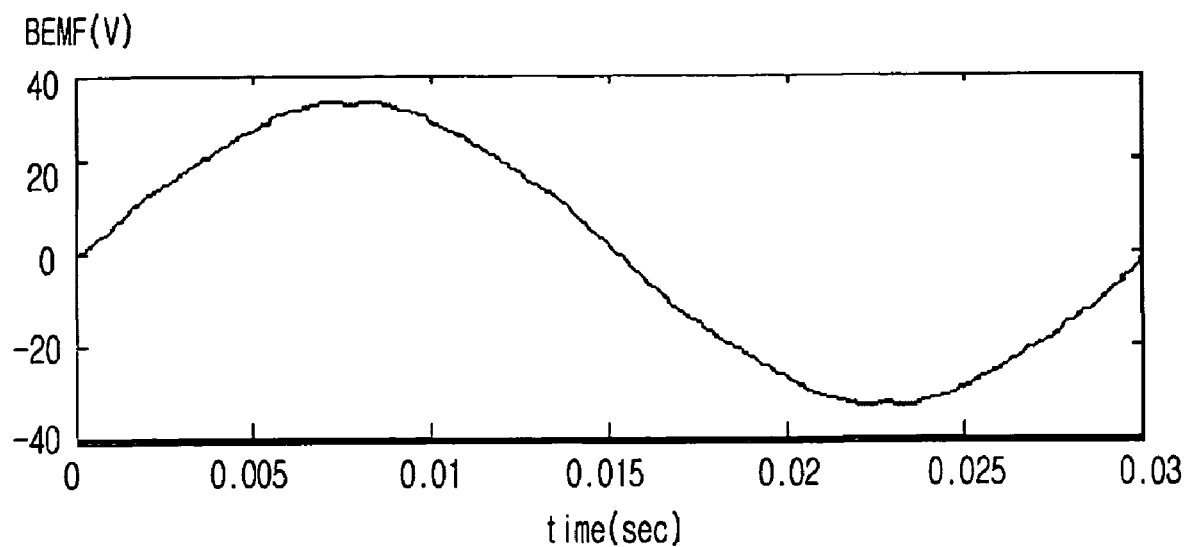
FIG. 11 is a graph illustrating a back electro motive force of the permanent-magnet motor according to the embodiment of the present invention shown in FIG. 8.
Figure 11:
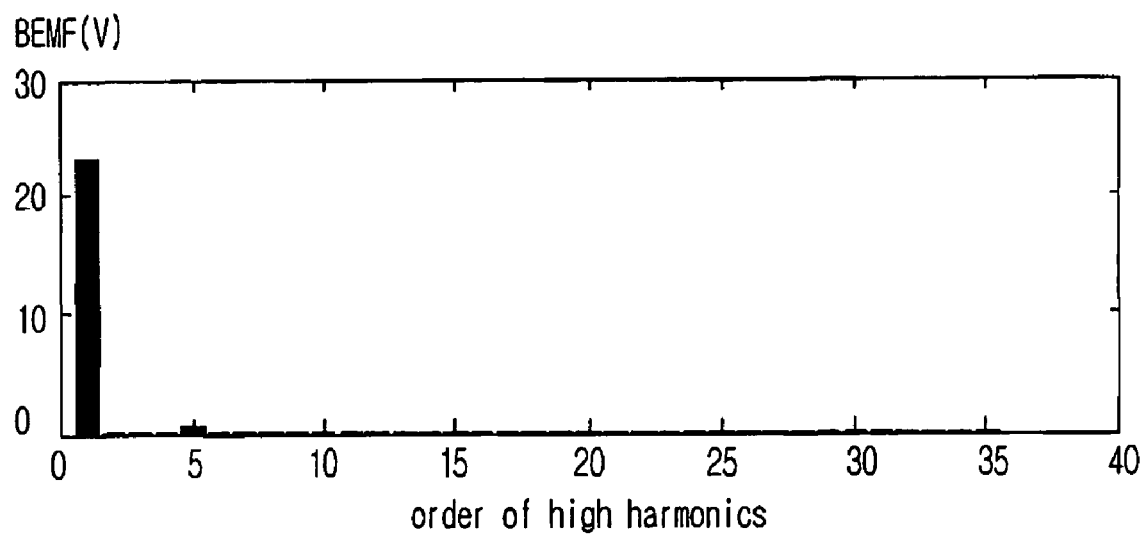

The back electro motive force of the permanent-magnet motor of this embodiment of the present invention is illustrated in FIG. 11.

As shown in FIG. 11, all of the high harmonic components except the first high harmonic are reduced by forming the two-stepped stator protrusions 14-1 at the middle parts of the teeth 14 of the stator 10, and the two-stepped rotor grooves 26-1 at the outer circumferential surface of the rotor 26. Consequently, the back electro motive force wave is approximated to a sinusoidal wave.

As a result, torque ripple is decreased, and, therefore, vibration generated during rotation of the rotor 26 is minimized, and noise is also decreased. Consequently, reliability of the motor is improved.

Figure 12:
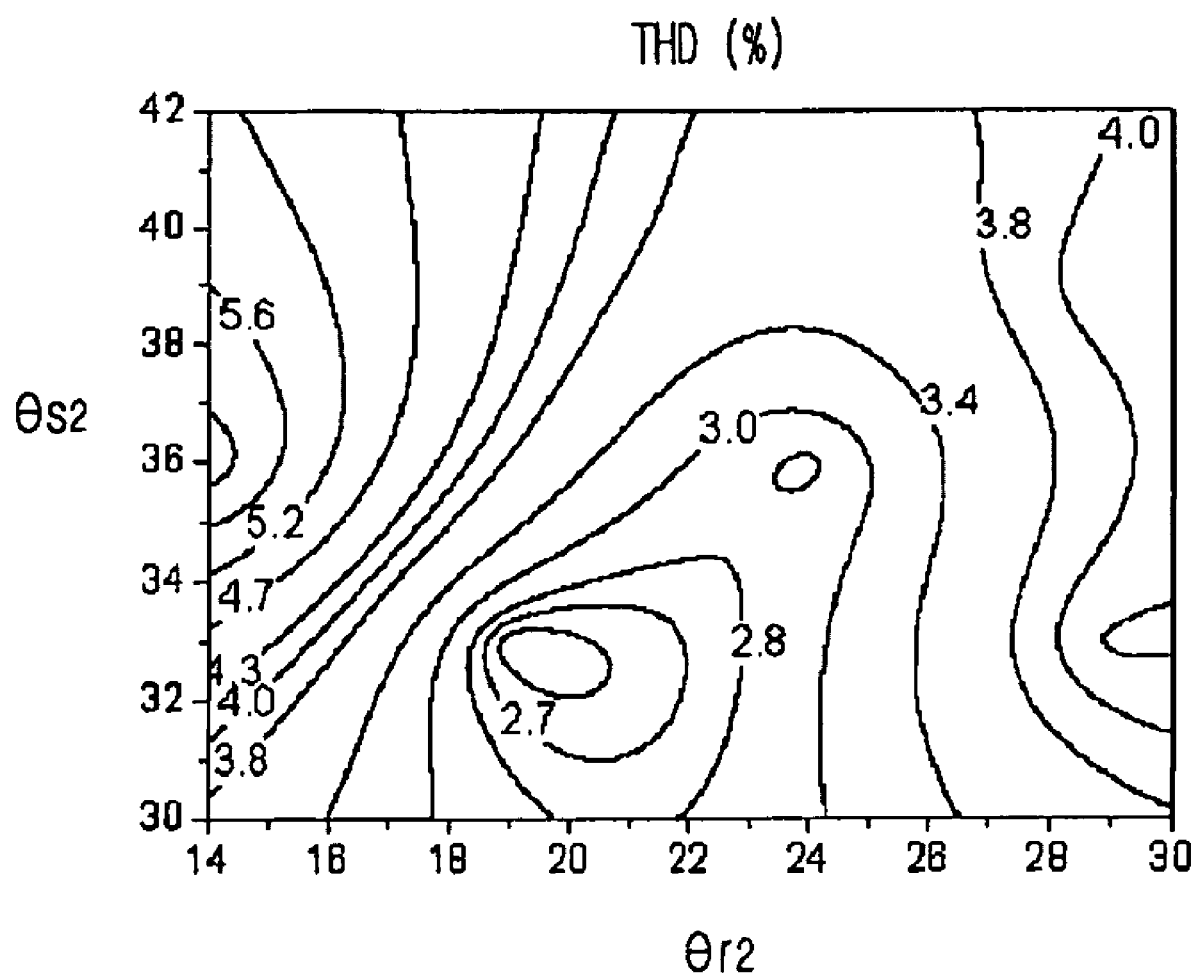
FIG. 12 is a view illustrating distribution of total harmonic distortion (THD) of the back electro motive force of the permanent-magnet motor according to the embodiment of the present invention shown in FIG. 8 based on change in a stator protrusion angle $\theta_{s2}$ and a rotor groove angle $\theta_{r2}$.

FIG. 12 illustrates the simulation results of total harmonic distortion of a back electro motive force generated when the second stator protrusion angle $\theta_{s2}$ is changed within a range of 30 to 42 degrees, and the second rotor groove angle $\theta_{r2}$ is changed within a range of 14 to 30 degrees.

As can be seen from FIG. 12, the total harmonic distortion of the back electro motive force of the permanent-magnet motor according to this embodiment of the present invention, which is characterized in that the two-stepped stator protrusions 14-1 are formed at the middle parts of the teeth 14 of the stator 10, and the two-stepped rotor grooves 26-1 are formed at the outer circumferential surface of the rotor 26, is approximately 2.2%, which is less than the total harmonic distortion (approximately 15%) of the back electro motive force of the conventional permanent-magnet motor.

Figure 13:
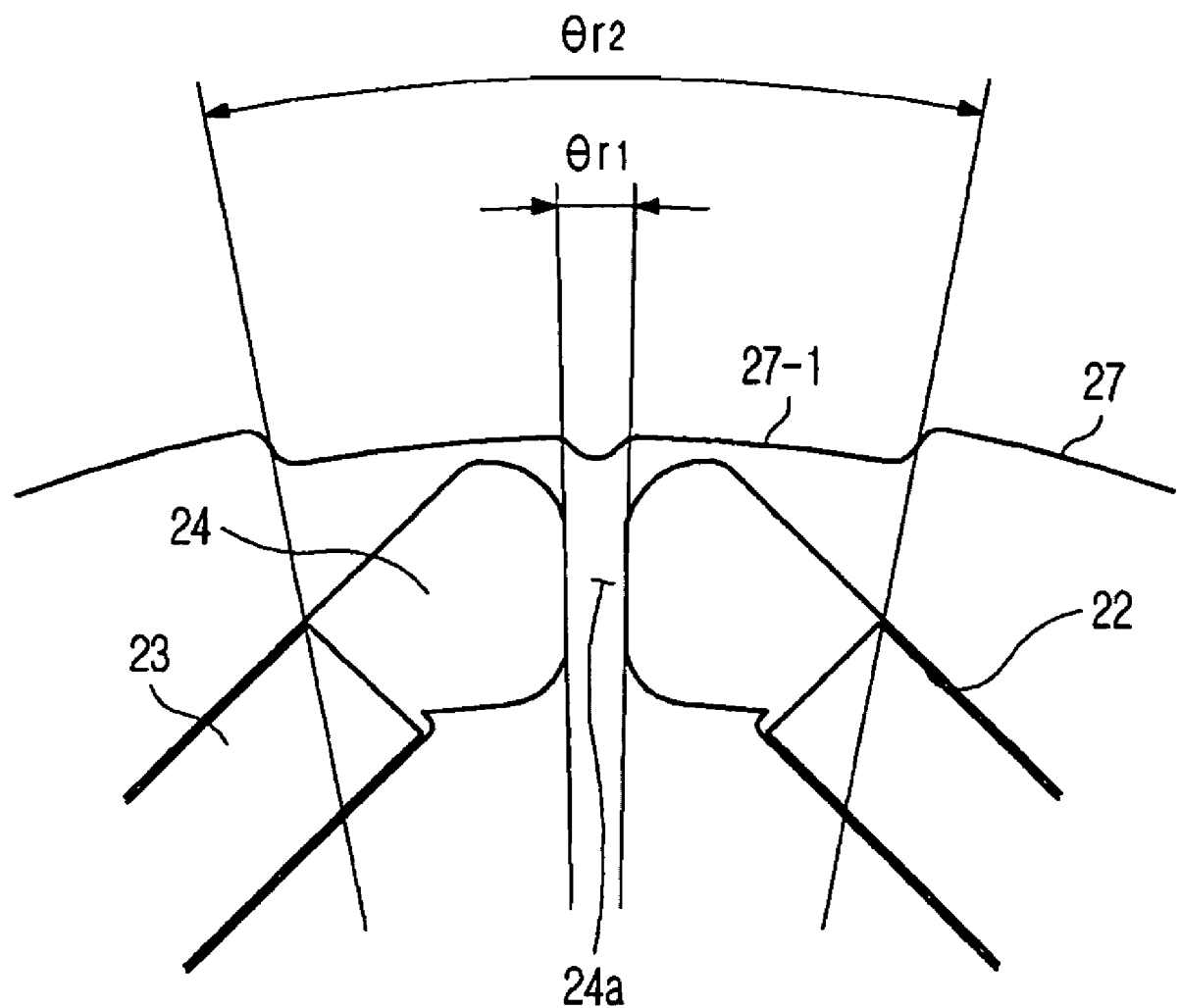
FIG. 13 is a detailed view illustrating the surface of a rotor of a permanent-magnet motor according to yet another embodiment of the present invention.

FIG. 13 is a detailed view illustrating the surface of a rotor 27 of a permanent-magnet motor according to yet another embodiment of the present invention.

As shown in FIG. 13, the rotor 27 is provided at the outer circumferential surface thereof with stepped rotor grooves 27-1, which are adjacent to the flux barrier holes 24 and arranged in the circumferential direction, such that the length of the gap 40 between the surface of each of the teeth 14 of the stator 10 and the outer circumferential surface of the rotor 27 is not uniform.

Each of the rotor grooves 27-1 is depressed in a width measured by a second rotor groove angle $\theta_{r2}$ about the rotary shaft 30, and is further depressed in a width measured by a first rotor groove angle $\theta_{r1}$ about the rotary shaft 30. Consequently, each of the rotor grooves 27-1 is formed in a two-stepped shape. Preferably, though not necessarily, the second rotor groove angle $\theta_{r2}$ is approximately 22 degrees, and the first rotor groove angle $\theta_{r1}$ is approximately 2 to 18 degrees.

Figure 14:
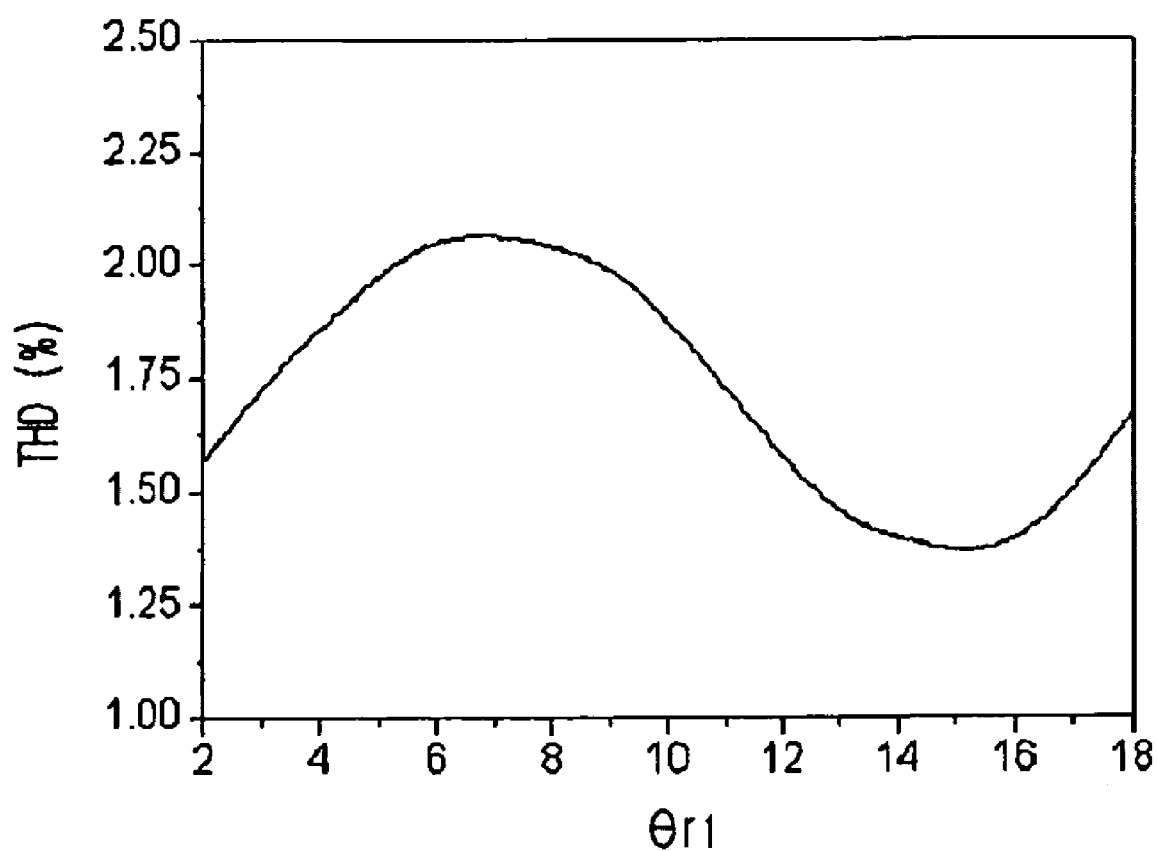
FIG. 14 is a view illustrating distribution of total harmonic distortion (THD) of the back electro motive force of the permanent-magnet motor according to the embodiment of the present invention shown in FIG. 13 based on change in a rotor groove angle $\theta_{r1}$.

As shown in FIG. 14, total harmonic distortion of a back electro motive force generated when the first rotor groove angle $\theta_{r1}$ is changed within a range of 2 to 18 degrees is less than approximately 2%, which is less than the total harmonic distortion (approximately 15%) of the back electro motive force of the conventional permanent-magnet motor.

Figure 15:
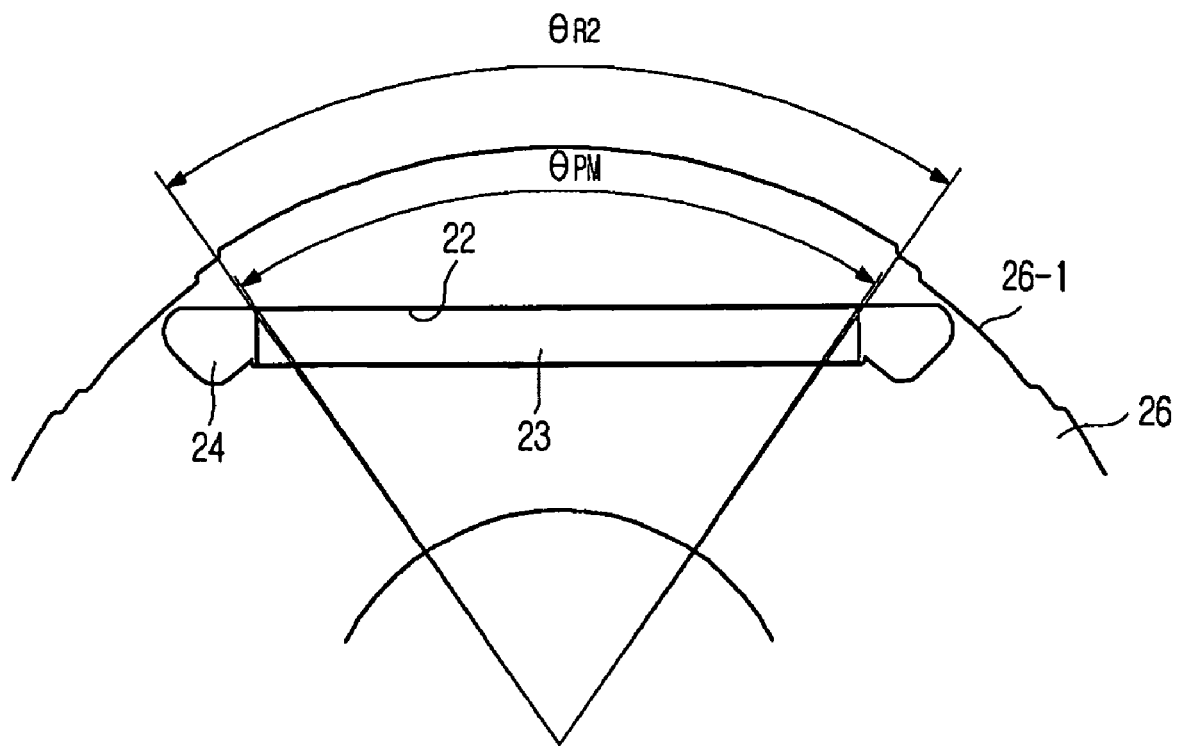
FIG. 15 is a view illustrating a relation between an effective magnetic pole angle $\theta_{PM}$ of the permanent magnet and a rotor protrusion angle $\theta_{R2}$ of the permanent-magnet motor according to an embodiment of the present invention.

FIG. 15 is a view illustrating a relation between an effective magnetic pole angle $\theta_{PM}$ of the permanent magnet and a rotor protrusion angle $\theta_{R2}$ of the permanent-magnet motor according to an embodiment of the present invention.

On the assumption that an angle $\theta_{R2}$ between the second rotor groove angle $\theta_{r2}$ and the next second rotor groove angle $\theta_{r2}$ of the embodiment shown in FIG. 8 is a rotor protrusion angle, reduction of the total harmonic distortion of the back electro motive force and reduction of cogging torque are changed based on the rotor protrusion angle $\theta_{R2}$ and effective magnetic pole angle $\theta_{PM}$ of the permanent magnet.

If the rotor protrusion angle $\theta_{R2}$ is greater than the effective magnetic pole angle $\theta_{PM}$ of the permanent magnet, for example, the total harmonic distortion (THD) of the back electro motive force is further reduced than the cogging torque. On the other hand, if the rotor protrusion angle $\theta_{R2}$ is less than the effective magnetic pole angle $\theta_{PM}$ of the permanent magnet, the cogging torque is further reduced than the total harmonic distortion (THD) of the back electro motive force.

According to the present invention, the permanent-magnet motor is designed such that the rotor protrusion angle $\theta_{R2}$ is greater than or equal to the effective magnetic pole angle $\theta_{PM}$ of the permanent magnet in order to maximally reduce the total harmonic distortion (THD) of the back electro motive force.

In the illustrated embodiments, the stator protrusions 12-1, 14-1 are formed at the middle parts of the teeth 12, 14 of the stator 10 in the one- or two-stepped shape, and the rotor grooves 20-1,26-1,27-1 are formed at the outer circumferential surface of the rotor 20,26,27 in the one- or two-stepped shape, but the present invention is not limited to these embodiments. For example, the stator may have one-stepped stator protrusions while the rotor has two-stepped rotor grooves, or the stator may has two-stepped stator protrusions while the rotor has one-stepped rotor grooves, which may achieve the same aspects and advantages as the illustrated embodiments of the present invention.

As apparent from the above description, the present invention provides a permanent-magnet motor having stepped protrusions formed at the middle parts of teeth of a stator and/or stepped grooves formed at the outer circumferential surface of a rotor, to approximate change in magnetic flux at a gap to a sinusoidal wave, thereby creating a sinusoidal back electro motive force wave. As a result, torque ripple is decreased, and, therefore, vibration generated during rotation of the rotor is minimized, and noise is also decreased. Consequently, the reliability of the motor is improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A permanent-magnet motor comprising:
a stator provided with a plurality of teeth; and
a rotor having permanent magnets disposed therein;
wherein the stator has a plurality of protrusions respectively formed at surfaces of the teeth, at least one protrusion of the plurality of protrusions being opposite to an outer circumferential surface of the rotor, to approximate sinusoidal change in magnetic flux,
wherein the rotor has a plurality of grooves respectively formed at an outer circumferential surface thereof, at least one groove of the plurality of grooves being opposite to an inner circumferential surface of the stator, to approximate sinusoidal change in magnetic flux,
each stator tooth having a tooth body and a circumferentially-extended end portion that is wider than the tooth body, wherein the plurality of protrusions are respectively formed in a shape of a plurality of steps at the circumferentially extended end of each tooth opposite to the outer circumferential surface of the rotor, at least one step of the plurality of steps is formed at a middle part of the circumferentially extended end of a tooth of the plurality of teeth of the stator, and an innermost step of the plurality of steps extends to a width that is greater than or equal to a width of the tooth body and is greater than a distance between two stator teeth.

2. The motor according to claim 1, wherein the plurality of grooves are spaced a predetermined gap from the inner circumferential surface of the stator.

3. The motor according to claim 2, wherein the rotor is provided with flux barrier holes formed at opposite ends of the permanent magnets, and the grooves are respectively provided adjacent to the flux barrier holes.

4. The motor according to claim 3, wherein the flux barrier holes are disposed in parallel with permanent magnet insertion holes, in which the permanent magnets are respectively inserted.

5. A permanent-magnet motor comprising:
a stator provided with a plurality of teeth; and
a rotor having permanent magnets disposed therein;
wherein the stator has a plurality of protrusions respectively formed at surfaces of the teeth, at least one protrusion of the plurality of protrusions being opposite to an outer circumferential surface of the rotor, to approximate sinusoidal change in magnetic flux,
each stator tooth having a tooth body and a circumferentially-extended end portion that is wider than the tooth body, wherein the plurality of protrusions are respectively formed in a shape of a plurality of steps at the circumferentially extended end of each tooth opposite to the outer circumferential surface of the rotor, at least one step of the plurality of steps is formed at a middle part of the circumferentially extended end of a tooth of the plurality of teeth of the stator, and an innermost step of the plurality of steps extends to a width that is greater than or equal to a width of the tooth body and is greater than a distance between two stator teeth.

6. A permanent-magnet motor comprising:
a stator provided with a plurality of teeth; and
a rotor having permanent magnets disposed therein;
wherein the rotor has a plurality of grooves respectively formed at an outer circumferential surface thereof, at least one groove of the plurality of grooves being opposite to an inner circumferential surface of the stator, to approximate sinusoidal change in magnetic flux,
wherein the stator has a plurality of protrusions respectively formed at surfaces of the teeth, at least one protrusion of the plurality of protrusions being opposite to the outer circumferential surface of the rotor, to approximate the sinusoidal change in magnetic flux,
each stator tooth having a tooth body and a circumferentially-extended end portion that is wider than the tooth body, wherein the plurality of protrusions are respectively formed in a shape of a plurality of steps at the circumferentially extended end of each tooth opposite to the outer circumferential surface of the rotor, at least one step of the plurality of steps is formed at a middle part of the circumferentially extended end of a tooth of the plurality of teeth of the stator, and an innermost step of the plurality of steps extends to a width that is greater than or equal to a width of the tooth body and is greater than a distance between two stator teeth, and
wherein the plurality of grooves are spaced a predetermined gap from the inner circumferential surface of the stator.

7. The motor according to claim 6, wherein the rotor is provided with flux barrier holes formed at opposite ends of the permanent magnets, and the grooves are respectively provided adjacent to the flux barrier holes.

8. A permanent-magnet motor comprising:
a stator provided with a plurality of teeth; and
a rotor having permanent magnets disposed therein;
wherein the stator has a plurality of protrusions respectively formed at an inner circumferential surface thereof, the plurality of protrusions being opposite to an outer circumferential surface of the rotor, to approximate sinusoidal change in magnetic flux,
each stator tooth having a tooth body and a circumferentially-extended end portion that is wider than the tooth body, wherein the plurality of protrusions are respectively formed in a shape of a plurality of steps at the circumferentially extended end of each tooth opposite to the outer circumferential surface of the rotor, at least one step of the plurality of steps is formed at a middle part of the circumferentially extended end of a tooth of the plurality of teeth of the stator, and an innermost step of the plurality of steps extends to a width that is greater than or equal to a width of the tooth body and is greater than a distance between two stator teeth.

9. A permanent-magnet motor comprising:
a stator provided with a plurality of teeth; and
a rotor having permanent magnets disposed therein;
wherein an outer circumferential surface of the rotor, opposite to an inner circumferential surface of the stator, varies in a radial direction so as to provide a non-uniform gap between the rotor and stator to approximate sinusoidal change in magnetic flux,
wherein the stator has a plurality of protrusions formed at an inner circumferential surface thereof, at least one protrusion of the plurality of protrusions being opposite to an outer circumferential surface of the rotor, to approximate sinusoidal change in magnetic flux, and
each stator tooth having a tooth body and a circumferentially-extended end portion that is wider than the tooth body, wherein the plurality of protrusions are respectively formed in a shape of a plurality of steps at the circumferentially extended end of each tooth opposite to the outer circumferential surface of the rotor, at least one step of the plurality of steps is formed at a middle part of the circumferentially extended end of a tooth of the plurality of teeth of the stator, and an innermost step of the plurality of steps extends to a width that is greater than or equal to a width of the tooth body and is greater than a distance between two stator teeth.

10. The motor of claim 9, wherein a plurality of grooves are respectively provided on the outer circumferential surface of the rotor to vary the outer circumferential surface in the radial direction.

11. The motor of claim 10, wherein at least one groove of the plurality of grooves is formed with a width of approximately 14-30 degrees around the outer circumferential surface of the rotor.

12. A permanent-magnet motor comprising:
a stator; and
a rotor having permanent magnets disposed therein;
wherein an outer circumferential surface of the rotor, opposite to an inner circumferential surface of the stator, varies in a radial direction so as to provide a non-uniform gap between the rotor and stator to approximate sinusoidal change in magnetic flux,
wherein a plurality of grooves are provided on the outer circumferential surface of the rotor to vary the outer circumferential surface in the radial direction,
wherein the plurality of grooves are formed in a shape of at least one step,
wherein a first groove is formed with a width of approximately 14-30 degrees around the outer circumferential surface of the rotor,
wherein a second groove is formed with a width of approximately 2-18 degrees around the outer circumferential surface of the rotor, and within the first groove.

13. A permanent-magnet motor comprising:
a rotor having permanent magnets disposed therein; and
a stator having teeth extending inward toward the rotor;
wherein an inner circumferential surface of the teeth of the stator, opposite to an outer circumferential surface of the rotor, varies in a radial direction so as to provide a non-uniform gap between the rotor and stator to approximate sinusoidal change in magnetic flux,
wherein a plurality of protrusions are provided on the inner circumferential surface of each of the teeth of the stator to vary the inner circumferential surface, the at least one protrusion being opposite to an outer circumferential surface of the rotor, to approximate sinusoidal change in magnetic flux, and
each stator tooth having a tooth body and a circumferentially-extended end portion that is wider than the tooth body, wherein the plurality of protrusions are respectively formed in a shape of a plurality of steps at the circumferentially extended end of each tooth opposite to the outer circumferential surface of the rotor, at least one step of the plurality of steps is formed at a middle part of the circumferentially extended end of a tooth of the plurality of teeth of the stator, and an innermost step of the plurality of steps extends to a width that is greater than or equal to a width of the tooth body and is greater than a distance between two stator teeth.

14. The permanent-magnet motor of claim 13, wherein at least one protrusion of the plurality of protrusions is formed with a width of approximately 30-42 degrees around the inner circumferential surface of at least one of the teeth.

15. A permanent-magnet motor comprising:
a rotor having permanent magnets disposed therein; and
a stator having teeth extending inward toward the rotor;
wherein an inner circumferential surface of the teeth of the stator, opposite to an outer circumferential surface of the rotor, varies in a radial direction so as to provide a non-uniform gap between the rotor and stator to approximate sinusoidal change in magnetic flux,
wherein a plurality of protrusions are provided on the inner circumferential surface of the teeth of the stator to vary the inner circumferential surface,
wherein the plurality of protrusions are formed in a shape of at least one step,
wherein a first protrusion is formed with a width of approximately 30-42 degrees around the inner circumferential surface of at least one of the teeth, and
wherein a second protrusion is formed with a width of approximately 28 degrees around the inner circumferential surface of the at least one of the teeth, and on the first protrusion.

* * * * *